(12) United States Patent
Watanabe

(10) Patent No.: US 7,933,911 B2
(45) Date of Patent: Apr. 26, 2011

(54) MEDIUM STORING DOCUMENT RETRIEVAL PROGRAM, DOCUMENT RETRIEVAL APPARATUS AND DOCUMENT RETRIEVAL METHOD

(75) Inventor: Isamu Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 535 days.

(21) Appl. No.: 11/901,481

(22) Filed: Sep. 18, 2007

(65) Prior Publication Data

US 2008/0162476 A1 Jul. 3, 2008

(30) Foreign Application Priority Data

Dec. 27, 2006 (JP) ................................. 2006-352839

(51) Int. Cl.
*G06F 17/30* (2006.01)
(52) U.S. Cl. .................... 707/758; 707/769; 707/770
(58) Field of Classification Search .................. 707/722, 707/723, 728, 770, 769, 758
See application file for complete search history.

(56) References Cited

U.S. PATENT DOCUMENTS

| | | | | |
|---|---|---|---|---|
| 5,519,857 | A * | 5/1996 | Kato et al. ............................ | 1/1 |
| 5,696,916 | A * | 12/1997 | Yamazaki et al. ............ | 715/853 |
| 5,757,983 | A * | 5/1998 | Kawaguchi et al. .......... | 382/305 |
| 6,094,647 | A * | 7/2000 | Kato et al. ............................ | 1/1 |
| 6,847,972 | B1 * | 1/2005 | Vernau et al. ......................... | 1/1 |
| 6,901,392 | B1 * | 5/2005 | Kindo ............................ | 706/25 |
| 6,948,121 | B2 * | 9/2005 | Kindo ............................ | 715/210 |
| 7,010,515 | B2 * | 3/2006 | Nakano ........................... | 707/776 |
| 7,305,415 | B2 * | 12/2007 | Vernau et al. ........................ | 1/1 |

FOREIGN PATENT DOCUMENTS

| | | |
|---|---|---|
| JP | 11-328192 | 11/1999 |
| JP | 2002-351896 | 12/2002 |
| JP | 2003-044493 | 2/2003 |

OTHER PUBLICATIONS

Watanabe et al.; "Text Mining Based on Keyword Association"; Computer Systems Labs, Fujitsu Laboratories Ltd., Japan; Jul. 16, 1999; pp. 57-64.

* cited by examiner

*Primary Examiner* — Jean M Corrielus
(74) *Attorney, Agent, or Firm* — Fujitsu Patent Center

(57) ABSTRACT

A medium storing a document retrieval program, a document retrieval apparatus and a document retrieval method that can retrieve a classification code of an appropriate grain size are provided. A medium computer-readably storing a document retrieval program causes a computer to execute a process comprising an acquisition step that acquires the first key information, or the key for retrieving a document, a first retrieval step that causes documents containing the first key information to be retrieved from a predetermined range in the database, a first extraction step that extracts the first classification codes from the documents retrieved by the first retrieval step as candidate classification codes, the first classification code being related to the documents, a second retrieval step that causes documents containing candidate classification codes to be retrieved from the predetermined range, a second extraction step that extracts the second key information contained in the documents retrieved by the second retrieval step, the second key information being of the type same as the first key information and an evaluation step that evaluates the candidate classification codes on the basis of comparison of the first key information and the second key information.

19 Claims, 10 Drawing Sheets

FIG.3

RETRIEVAL FORMULA: SPEECH RECOGNITION [RETRIEVE]
NUMBER OF CLASSIFICATION CATEGORIES TO BE DISPLAYED: 20
RELATED WORDS TO BE DISPLAYED: ○ NON-DISPLAY OF RELATED WORDS (~ SEVERAL SECONDS)   ◉ DISPLAY OF RELATED WORDS (~ TENS OF SEVERAL SECONDS)   NUMBER OF RELATED WORDS: 10
WEIGHTING: ○ NON-USE OF WEIGHT   ◉ USE OF WEIGHT
CLASSIFICATION FORMAT: ◉ ATMS  ○ IPDL  ○ ACCENT

☐ IPC <SUBCLASS>          ☐ IPC (MAIN GROUP)          ☐ IPC (SUBGROUP)          ☐ IPC (FULL)          FORWARD AGREEMENT: [ ]
☑ FI <SUBCLASS>           ☑ FI (MAIN GROUP)           ☑ FI (SUBGROUP)           ☑ FI (FULL)           FORWARD AGREEMENT: [ ]
☐ F TERM (THEME GROUP)    ☑ F TERM (THEME CODE)       ☑ F TERM (THEME CODE + VIEWPOINT)   ☑ F TERM (FULL)   FORWARD AGREEMENT: [ ]

☐ FACET

FIG.5

| ORDER | NUMBER OF APPEARANCES | DEGREE OF RELEVANCE | RELATIVE SCORE | FI | LINK | RELATED FI / RELATED WORD |
|---|---|---|---|---|---|---|
| 1 | 5859/8628 | 1.00 | ▇▇▇▇▇▇ | G10L | PDL | SPEECH RECOGNITION, SPEECH RECOGNITION, INPUT, CODE, SPEECH SIGNAL, REPRODUCTION SYNTHESIS, OUTPUT, SPEECH DATA, WORD |
| 2 | 5702/8628 | 0.96 | ▇▇▇▇▇▇ | G10L3 | PDL | SPEECH RECOGNITION, SPEECH RECOGNITION, INPUT, WORD, OUTPUT, SYNTHESIS, SPEECH SIGNAL, SPEECH DATA, CHARACTERISTIC, MEMORY |
| 3 | 5554/8628 | 0.96 | ▇▇▇▇▇▇ | G10L3/00 | PDL | SPEECH RECOGNITION, SPEECH RECOGNITION, INPUT, WORD, SYNTHESIS, OUTPUT, CHARACTERISTIC, MEMORY, SPEECH DATA, SPEECH SYNTHESIS |
| 4 | 2497/8628 | 0.29 | ▇▇▇ | G06F | PDL | IMAGE, MEMORY, DISPLAY, INPUT, MEMORY, MANAGEMENT PROGRAM, CONTROL, TERMINAL, PRINTING, FILE |
| 5 | 1402/8628 | 0.19 | ▇▇ | G06F3 | PDL | DISPLAY, PRINTING, IMAGE, INPUT, MEMORY OPERATION, PRINTER, CONTROL, SCREEN, OUTPUT, KEY |
| 6 | 1242/8628 | 0.18 | ▇▇ | G06F3/16 | PDL | SPEECH RECOGNITION, INPUT, SPEECH RECOGNITION, OUTPUT, SPEECH DATA, DISPLAY, TEXT, SPEECH INPUT, CHARACTER, MEMORY |
| 7 | 1489/8628 | 0.18 | ▇▇ | H04M | PDL | TELEPHONE, COMMUNICATION, TERMINAL, LINE, SPEECH, PORTABLE PHONE, NUMBER, INCOMING CALL, TELEPHONE SET, TALK, TRANSMISSION |
| 8 | 923/8628 | 0.10 | ▇ | G10L3/00,561A | PDL | SPEECH RECOGNITION, SPEECH RECOGNITION, TELEPHONE, INPUT, TERMINAL, COMMUNICATION, USER, SPEECH, INPUT, TALKER, SPEECH DATA |
| 9 | 765/8628 | 0.10 | ▇ | H04M1 | PDL | TELEPHONE, PORTABLE PHONE, COMMUNICATION, TERMINAL, PORTABLE TELEPHONE SET, SPEECH, INCOMING CALL, NUMBER, PORTABLE TELEPHONE SET, DISPLAY |
| 10 | 509/8628 | 0.10 | ▇ | G06F3/16,320H | PDL | SPEECH RECOGNITION, SPEECH RECOGNITION, INPUT, SPEECH, INPUT, WORD, DIALOG, SPEECH DATA, USER, TEXT, CHARACTER |
| ... | | | | | | |
| 20 | 586/8628 | 0.07 | ▇ | G06F17 | PDL | TERMINAL, MANAGEMENT, RETRIEVAL, COMMODITY, USER, SERVER, MEMORY, CONTENTS, CLIENT, DISPLAY, DOCUMENT |

FIG.6

| | FI | LINK | RELATED WORD |
|---|---|---|---|
| ◎ | G10L | IPDL | SPEECH, RECOGNITION, SPEECH RECOGNITION, INPUT, CODE, SPEECH SIGNAL, REPRODUCTION, SYNTHE |
| ◎ | G10L3 | IPDL | SPEECH, RECOGNITION, SPEECH RECOGNITION, INPUT, WORD, OUTPUT, CYNTHESIS, SPEECH SIGNAL |
| ◎ | G10L3/00 | IPDL | SPEECH, RECOGNITION, SPEECH RECOGNITION, INPUT, WORD, SYNTHESIS, OUTPUT, CHARACTERISTIC, M |
| | G06F | IPDL | IMAGE, MEMORY, DISPLAY, INPUT, MEMORY, MANAGEMENT, PROGRAM, CONTROL, TERMI |
| | G06F3 | IPDL | DISPLAY, PRINTING, IMAGE, INPUT, MEMORY, OPERATION, PRINTER, CONTROL, SCREEN, |
| ◎ | G06F3/16 | IPDL | SPEECH, RECOGNITION, INPUT, SPEECH RECOGNITION, OUTPUT, SPEECH DATA, DISPLAY, TEX |
| ○ | H04M | IPDL | TELEPHONE, COMMUNICATION, TERMINAL, LINE, SPEECH, PORTABLE PHONE, NUMBER, INCOMING CALL, TE |
| ◎ | G10L3/00.551A | IPDL | SPEECH, RECOGNITION, SPEECH RECOGNITION, INPUT, TERMINAL, COMMUNICATION, USER |
| ○ | H04M1 | IPDL | TELEPHONE, PORTABLE PHONE, COMMUNICATION, TERMINAL, PORTABLE TELEPHONE SET, SPEECH, INCOMING CALL |
| ◎ | G06F3/16.320H | IPDL | SPEECH, RECOGNITION, SPEECH RECOGNITION, INPUT, SPEECH, INPUT, WORD, DIALOG, SPEEC |
| ◎ | G10L3/00.561C | IPDL | SPEECH, RECOGNITION, SPEECH RECOGNITION, INPUT, DISPLAY, SPEECH, INPUT, WORD, CAND |
| ◎ | G10L3/02 | IPDL | SPEECH, NOISE, SPEECH SIGNAL, RECOGNITION, INPUT, SIGNAL, SPEECH RECOGNITION, FREQ |
| ◎ | G06F15 | IPDL | IMAGE, INPUT, DISPLAY, MEMORY, RETRIEVAL, DOCUMENT, CONVERSION, CHARACTER, MANAGEMENT |
| ◎ | G10L3/00.571K | IPDL | SPEECH, RECOGNITION, SPEECH RECOGNITION, INPUT, SPEECH RECOGNITION APPARATUS |

FIG.7

RETRIEVAL FORMULA: "G10L 3/00"
NUMBER OF CLASSIFICATION
CATEGORIES TO BE DISPLAYED: 20
RELATED WORDS
TO BE DISPLAYED: ○ NON-DISPLAY OF RELATED WORDS (~ SEVERAL SECONDS)  ⦿ DISPLAY OF RELATED WORDS (~ TENS OF SEVERAL SECONDS)   NUMBER OF RELATED WORDS: 10   [RETRIEVE]
WEIGHTING: ○ NON-USE OF WEIGHT  ⦿ USE OF WEIGHT
CLASSIFICATION FORMAT: ⦿ ATMS ○ IPDL ○ ACCENT

☐ IPC <SUBCLASS>          ☐ IPC (MAIN GROUP)          ☐ IPC (SUBGROUP)          ☐ IPC (FULL)          FORWARD AGREEMENT:
☐ FI<SUBCLASS>            ☐ FI (MAIN GROUP)           ☐ FI (SUBGROUP)           ☐ FI (FULL)           FORWARD AGREEMENT:
☐ F TERM (THEME GROUP)    ☑ F TERM (THEME CODE)       ☐ F TERM (THEME CODE + VIEWPOINT)   ☐ F TERM (FULL)   FORWARD AGREEMENT:
☐ FACET

FIG.9

| ORDER | NUMBER OF APPEARANCES | DEGREE OF RELATEDNESS | RELATIVE SCORE | F TERM | LINK | RELATED F-TERM | RELATED WORD |
|---|---|---|---|---|---|---|---|
| 1 | 5261/12752 | 1.00 | ▮▮▮▮▮▮▮▮▮▮ | 5D015 | [PD] | G10L 3, G10L 3/00, G10L 3/00 551 A, G06F 3/16, G10L 3/00 551 G, G10L 3/00 551 Q, G10L 3/02, G10L 3/00 531 N, G06F 2 |
| 2 | 2555/12752 | 0.52 | ▮▮▮▮▮▮ | 5D045 | [PD] | G10L, G10L 3, G10L 9, G10L 9/18, G10L 3/00, G10L 9/18 J, G10L 3/00 Q, G10L 9/18 M, G10L 5, G06F 3/16, H03M 7 |
| 3 | 672/12752 | 0.15 | ▮▮ | 9A001 | [PD] | G06F, H04L 11, H04L, H04I 11/20, H04N, G06F 15, G10L, G03G 21, G03G 21/00, B41J |
| 4 | 528/12752 | 0.09 | ▮ | 5B075 | [PD] | G06F 17/30, G06F 17, G06F 17/30 110 F, G06F 17/30 170 Z, G06F 17/60, G06F 15/40, G06F 13/00, G06F 12/00, G06F 13, G06F 15 |
| 5 | 377/12752 | 0.09 | ▮ | 2F029 | [PD] | G01C 21, G01C 21/00, G01C, G08G, G08G 1, G08G 1/0969, G08G 29, G09B 29/00, G09B, G09B 29/00 A |
| 6 | 367/12752 | 0.05 | ▮ | 5H180 | [PD] | G08G, G08G 1, G01C 21/00, G01C 21, G01C, G08G 1/0969, G08G 1/0969, G09B 29, G09B 29/00, G09B 29/00 A |
| 7 | 349/12752 | 0.08 | ▮ | 5K027 | [PD] | H04M 1, H04M, H04M 1/00, H04B 7/26, H04B 7, H04B 7/26, H04M 1/725, H04M 11, H04M 1/00 R, H04M 11/00 |
| 8 | 310/12752 | 0.08 | ▮ | 5D108 | [PD] | G10K 15, G10K 15/04, G10K, G10K 15/04 302 D, G10K 15/04 302 F, G10H 1/00, G10H 1, G10L, G10L 3, G10H 1/00 102 Z |
| 9 | 360/12752 | 0.07 | ▮ | 5K101 | [PD] | H04M 11, H04M 11/00, H04M, H04M 11/00 302, H04M 11/00 303, H04M 1, H04M 11/00 301, H04B 7/26, H04B 7, H04B, H04M 1/00 |
| 10 | 364/12752 | 0.06 | ▮ | 5B091 | [PD] | G06F 17/28, G06F 17/27, G06F, G06F 17/22, G06F 15/38, G10L 3/00, G10L 3, G10L, G06F 17/28 Z, G06F 17/50, G06F 17/28 V |
| ... | | | | | | | |
| 19 | 187/12752 | 0.03 | ▮ | 5B009 | [PD] | G06F 17/21, G06F 17, G06F, G06F 15/20, G06F 3, G06F 15, G06F 17/30, G06F 17/21 501 T, G06F 12/00, G06F 12 |

FIG.10

| | F TERM | LINK | RELATED F TERM |
|---|---|---|---|
| ◎ | 5D015 | IPDL | G10L 3/00, G10L 3/00 551 A, G06F 3/16, G1 |
| ◎ | 5D045 | IPDL | G10L, G10L 9, G10L 9/18, G10L 3/00, G10L 9/18 J, G |
| ○ | 9A001 | IPDL | G10L, H04L 11, H04L, H04N 1, H04N, G06F 15, G10L |
| | 5B075 | IPDL | G06F, G06F 17/30, G06F 17, G06F 17/30 110 F, G06F 17/30 170 |
| | 2F029 | IPDL | G01C 21, G01C 21/00, G01C, G01C 21, G01C, G08G 1/0969, G08 |
| | 5H180 | IPDL | G08G, G08G 1, G08G 1, G08G 1/0969, G08 |
| | 5K027 | IPDL | H04M 1, H04M, H04M 1/00, H04B 7/26, H04B, H04M 1/7 |
| ○ | 5D108 | IPDL | G10K 15, G10K 15/04, G10K, G10K 15/04 302 D, G10K 15/04 302 |
| ◎ | 5K101 | IPDL | H04M 11, H04M, H04M 11/00, H04M 11/00 302, H04M 11/00 303 |
| | 5K067 | IPDL | G06F 17/28, G06F 17, G06F, G06F 17/22, G06F 17/28 Z, G06F 1E |
| | 5K024 | IPDL | H04B 7/26, H04B 7, H04B, H04M 1, H04M 1/00, H04B 7/26 |
| | 5E501 | IPDL | H04M 3/42, H04M 3, H04M, H04M 3/42 Z, H04M 11/00 |
| ◎ | 5B0091 | IPDL | G06F 3/00, G06F 3, G06F, G06F 3/00 651 A, G06F 3/00 656 A, G |
| | 5K015 | IPDL | H04M 3, H04M 3/42, H04M, H04M 11, H04M 3/493, H04M 3/493 |

MEDIUM STORING DOCUMENT RETRIEVAL PROGRAM, DOCUMENT RETRIEVAL APPARATUS AND DOCUMENT RETRIEVAL METHOD

BACKGROUND OF THE INVENTION

1. Field of the Invention

The present invention relates to a medium a recorded document retrieval program for retrieving classified documents, a document retrieval apparatus and a document retrieval method.

2. Description of the Related Art

Documents including patent documents and treatises contain document data that are hierarchically classified. When retrieving such documents by means of keywords, problematic cases of two different types as listed below can occur.
(Case 1) A same word has a plurality of different meanings.
(Case 2) A same concept is expressed by different words.

Case 1 can give rise to retrieval noises (unwanted documents are included in the retrieved documents), whereas case 2 can produce missing documents (a wanted document is or wanted documents are not included in the retrieved documents).

A technique for avoiding these problems (of retrieval noises and missing documents) is the use of classification codes. As for patent documents, each patent document may be provided with one or more than one hierarchical classification codes such as an IPC (International Patent Classification) code, a Japanese FI (File Index) or F (File Forming) term and/or a U.S. Patent Classification code. Particularly, in the case of FIs and F terms, classification codes are assigned to more than one hundred thousands items. Therefore, once the user can find out the classification code that matches the objective of retrieval, wanted documents can be retrieved highly accurately and reliably with minimal retrieval noises and minimal missing documents by using the classification code as key for the retrieval of documents. Then, however, another problem arises because the classification codes are too hierarchical and too minute and the user feels it difficult to find out the classification code that exactly matches the objective of retrieval.

The first conceivable technique for retrieving a classification code is the use of the sentence defining or explaining the classification code for the retrieval. This technique is actually being used in the patent map guidance in the Japanese IPDL (Industrial Property Digital Library). However, the document containing the sentence of the definition or the explanation has to be retrieved by means of a keyword with this first technique, this technique is not free from the problem of retrieval noises and missing documents.

Patent Document 1 (Jpn. Pat. Appln. Laid-Open Publication No. 11-328192) discloses a method of utilizing a concept dictionary that is provided separately for the purpose of lessening the problem of retrieval noises and missing documents. However, it is not easy to maintain the concept dictionary, accommodating the revisions made to the classification and technological developments.

The second conceivable technique for retrieving a classification code is the utilization of the co-occurrence relations of classification codes and keywords in documents (information on that classification codes and keywords appear concurrently in a same document). With this technique, information on documents is retrieved from keywords (or classification codes) and the classification codes that are strongly related to a specified keyword are rated and displayed after summing up the classification codes assigned to the obtained group of documents.

Patent Document 2 (Jpn. Pat. Appln. Laid-Open Publication No. 2002-351896) discloses a technique of retrieving a group of documents by utilizing keywords and patent classifications and extracting and displaying classification codes from the retrieved group of documents. Patent Document 3 (Jpn. Pat. Appln. Laid-Open Publication No. 2003-044493) discloses a technique of facilitating the effort of detecting adjacent (related) classification codes by sorting the retrieved and summed up classification codes into two hierarchies and displaying combinations of classification codes and definitions of classifications. With either of these techniques, it is possible to utilize variations of expressions of keywords in actual documents and hence reduce missing documents.

While the technique of utilizing co-ccurrence relations of classification codes and keywords in documents can reduce missing documents as described above, it is accompanied by the following problems.
(Problem 1) The problem of retrieval noises (classification codes that do not match the objective and the intension of the retrieval are displayed) remains when a large number of classification codes are frequently assigned to a patent document as in the case of the F terms.
(Problem 2) Since the classification codes assigned to document data are normally hierarchical, when same classification codes of a single type are totaled as classification codes of a plurality of hierarchies in a process of summing up the co-occurrence relations of keywords and classification codes, there arises a problem that they are strongly related to classification codes of upper hierarchies (it is not possible to find a classification code of an appropriate grain size).

SUMMARY OF THE INVENTION

It is therefore the object of the present invention to dissolve the above-identified problems by providing a medium storing a document retrieval program, a document retrieval apparatus and a document retrieval method that can retrieve a classification code of an appropriate grain size.

In the first aspect of the present invention, the above object is achieved by providing a medium computer-readably storing a document retrieval program for causing a computer to execute a process of retrieving a document having a first classification code assigned thereto in a database of documents, the first classification code being a classification code having a hierarchical structure, the process including: an acquisition step that acquires the first key information, or the key for retrieving a document; a first retrieval step that causes documents containing the first key information to be retrieved from a predetermined range in the database; a first extraction step that extracts the first classification codes from the documents retrieved by the first retrieval step as candidate classification codes, the first classification code being related to the documents; a second retrieval step that causes documents containing candidate classification codes to be retrieved from the predetermined range; a second extraction step that extracts the second key information contained in the documents retrieved by the second retrieval step, the second key information being of the type same as the first key information; and an evaluation step that evaluates the candidate classification codes on the basis of comparison of the first key information and the second key information.

In another aspect of the present invention, there is provided a document retrieval apparatus for retrieving documents having a first classification code assigned thereto in a database of documents, the first classification code being a classification code having a hierarchical structure, the apparatus including: an acquisition section that acquires the first key information, or the key for retrieving a document; a first retrieval section that causes documents containing the first key information to be retrieved from a predetermined range in the database; a first extraction section that extracts the first classification codes from the documents retrieved by the first retrieval section as candidate classification codes, the first classification code being related to the documents; a second retrieval section that causes documents containing candidate classification codes to be retrieved from the predetermined range; a second extraction section that extracts the second key information contained in the documents retrieved by the second retrieval section, the second key information being of the type same as the first key information; and an evaluation section that evaluates the candidate classification codes on the basis of comparison of the first key information and the second key information.

In still another aspect of the present invention, there is provided a document retrieval method for retrieving documents having a first classification code assigned thereto in a database of documents, the first classification code being a classification code having a hierarchical structure, the method including: an acquisition step that acquires the first key information, or the key for retrieving a document; a first retrieval step that causes documents containing the first key information to be retrieved from a predetermined range in the database; a first extraction step that extracts the first classification codes from the documents retrieved by the first retrieval step as candidate classification codes, the first classification code being related to the documents; a second retrieval step that causes documents containing candidate classification codes to be retrieved from the predetermined range; a second extraction step that extracts the second key information contained in the documents retrieved by the second retrieval step, the second key information being of the type same as the first key information; and an evaluation step that evaluates the candidate classification codes on the basis of comparison of the first key information and the second key information.

Thus, according to the present invention, it is possible to retrieve a classification code of an appropriate grain size.

BRIEF DESCRIPTION OF THE DRAWINGS

FIG. 3 is a schematic illustration of an image of retrieval input unit that can be used for the first embodiment;

FIG. 5 is a schematic illustration of a list of related keywords that can be used for the first embodiment, shown as the first example;

FIG. 6 is a schematic illustration of a list of related keywords that can be used for the first embodiment, shown as the second example;

FIG. 7 is a schematic illustration of an image of retrieval input unit that can be used for the second embodiment;

FIG. 9 is a schematic illustration of a list of related classification codes that can be used for the second embodiment, shown as the first example; and FIG. 10 is a schematic illustration of a list of related classification codes that can be used for the second embodiment, shown as the second example.

DETAILED DESCRIPTION OF THE PREFERRED EMBODIMENTS

Now, the present invention will be described in greater detail by referring to the accompanying drawings that illustrate preferred embodiments of the invention.

First Embodiment

This embodiment is a document retrieval apparatus for retrieving classification codes assigned to documents that are patent publications.

Firstly, the configuration of the document retrieval apparatus of this embodiment will be described.

Figure 1:
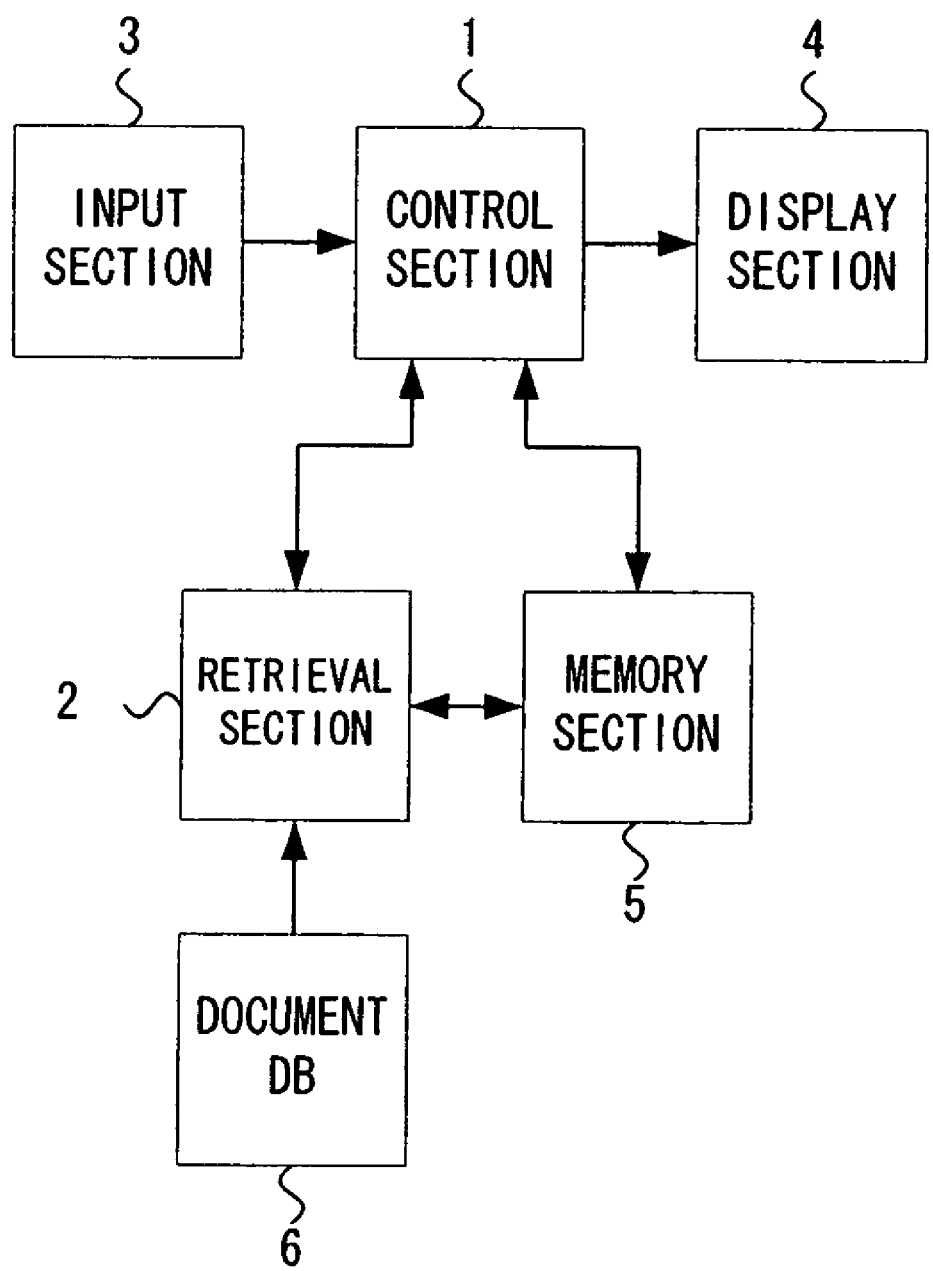
FIG. 1 is a schematic block diagram of the first embodiment of document retrieval apparatus, showing the configuration thereof.

FIG. 1 is a schematic block diagram of the first embodiment of document retrieval apparatus, showing the configuration thereof. Referring to FIG. 1, the document retrieval apparatus comprises a control section 1 that controls retrieval operations, a retrieval section 2 that retrieves documents, an input section 3 that receives input key information from the user, a display section 4 that displays images to the user, a memory section 5 that stores input key information and the results of retrieval operations and a document DB (database) 6 that manages documents.

Figure 2:
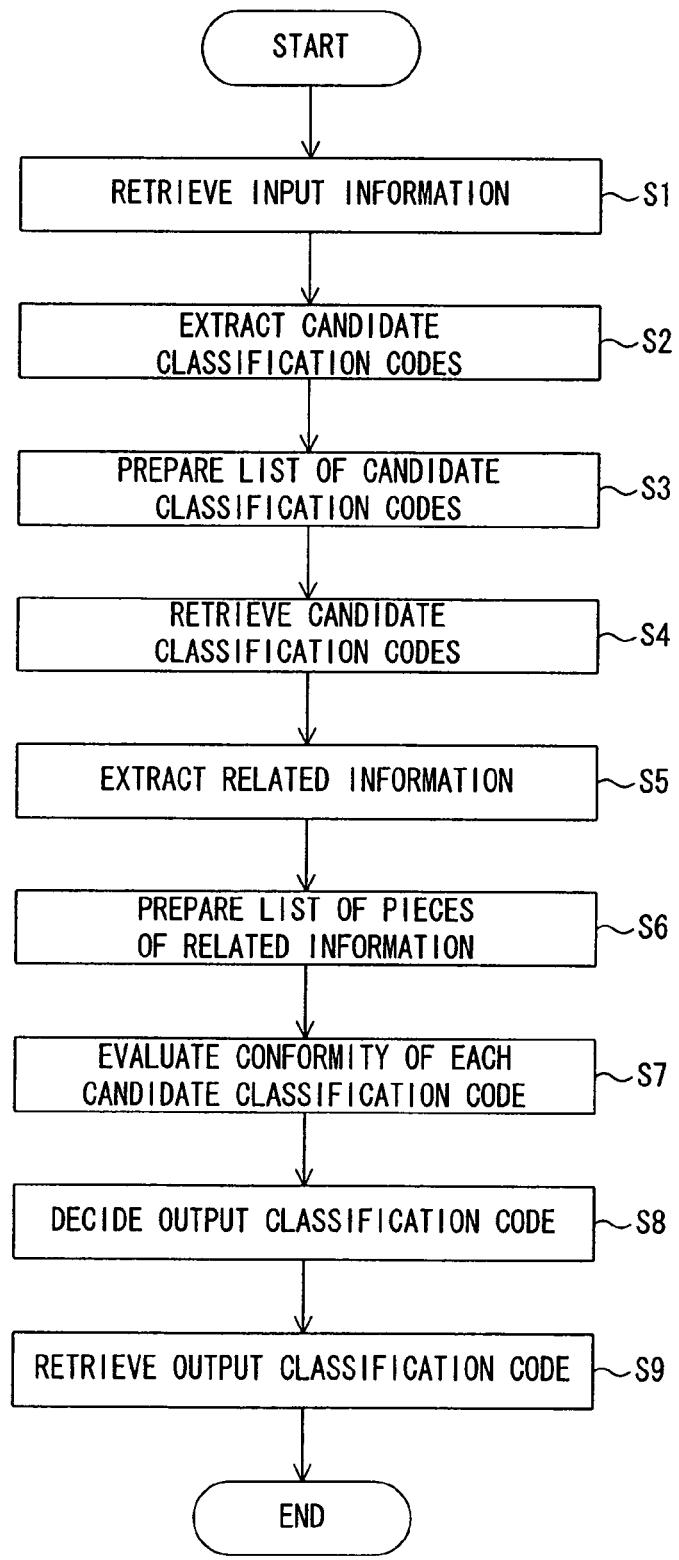
FIG. 2 is a summarized flowchart of the operation of the first embodiment of document retrieval apparatus.

Now, the operation of the document retrieval apparatus of the first embodiment will be described below. FIG. 2 is a summarized flowchart of the operation of the first embodiment of document retrieval apparatus.

(S1) The input section 3 receives input key information (the first key information) and the type of output classification code (the first classification code) from the user and delivers it to the control section 1. The input key information includes a keyword and a classification code. The control section 1 stores the input key information in the memory section 5 and directs the retrieval section 2 to retrieve documents that contain the input key information. The retrieval section 2 retrieves documents DB6 according to the directive from the control section 1.

(S2) The control section 1 extracts candidate classification codes that are candidates of classification codes from the group of documents obtained as a result of the retrieval.

(S3) The control section 1 sums up and ranks the extracted candidate classification codes and prepares a list of candidate classification codes where the candidate classification codes are ranked. Then, the control section 1 has the display section 4 display the list.

(S4) The control section 1 directs the retrieval section 2 to retrieve documents containing each of the candidate classification codes. The retrieval section 2 retrieves documents DB6 according to the directive from the control section 1.

(S5) The control section 1 extracts related key information (the second key information) from the group of documents obtained as a result of the retrieval. If the type of input key information is keyword, related key information is related keywords. On the other hand, if the type of input key information is classification code, related key information is related classification codes.

(S6) The control section 1 sums up and ranks the extracted pieces of related key information and prepares a list of pieces of related key information where the pieces of related key information are ranked. Then, the control section 1 has the display section 4 display the list.

(S7) The control section 1 evaluates the pieces of related key information and the candidate classification codes by comparing the input key information stored in the memory section 5 and the related key information and has the display section 4 display the outcome of the evaluation.

(S8) The control section 1 decides that the candidate classification code that is determined to show a high conformity rating in Step S7 is the output classification code.

(S9) The control section 1 directs the retrieval section 2 to retrieve documents containing the output classification code. The transversal section 2 retrieves documents DB6 according to the directive from the control section 1.

As a result of the above-described operation, it is possible to prepare a list of classification codes that are strongly related to the input key information.

Now, the operation of the document retrieval apparatus when the input key information is a keyword will be described in greater detail below.

Firstly, the operation of Step S1 will be described in detail.

FIG. 3 is a schematic illustration of an image of retrieval input unit that can be used for the first embodiment. In the image of retrieval input unit, the user can input a keyword (word) as input key information (retrieval formula). The keyword that is input is handled as input keyword. In this instance, the input keyword is "speech recognition". In the image of retrieval input unit, the user can specify the type of output classification code. In this instance, the type of classification code is the four FI hierarchies (subclass, main group, sub-group, full). Additionally, the user can specify the number of candidate classification codes to be displayed in the list of candidate classification codes (the number of classification categories to be displayed), display or non-display of related key information (related words), use or non-use of weight (weighting) and the format of output classification codes (classification format). Alternatively, it may be so arranged that the control section 1 has the user specify a patent document, extract a keyword from the document and input the extracted keyword as input keyword.

Then, the control section 1 directs the retrieval section 2 to retrieve documents from all the documents, using the input keyword as retrieval key. The retrieval section 2 retrieves the documents that contain the input keyword from all the documents in the document DB 6 and stores information on the group of the documents relating to the input keyword in the memory section 5.

Now, the operation of Step S2 will be described in detail.

The control section 1 extracts candidate classification codes from the object documents that are the documents obtained as a result of the retrieval in Step S1. The type of candidate classification codes is same as the type of the output classification code and FI in this instance. The control section 1 extracts one of the classification codes assigned to the object documents and the classification code of the higher hierarchy to which the classification code belongs as candidate classification codes, taking the hierarchical nature of candidate classification codes into consideration.

Now, the operation of Step S3 will be described in detail.

The control section 1 computationally determines the degree of relatedness between the input keyword and the candidate classification codes. More specifically, the control section 1 executes the first degree of relatedness computationally determining process that is devised by applying the process of computationally determining the degree of relatedness among words as described in the Non-Patent Document 1 (Isamu WATABE, Kazuo MISUE, "Text Mining Based on Keyword Association", The 55$^{th}$ IPSJ SIG notes, 1999) to a process of computationally determining the degree of relatedness (the first degree of relatedness) between the input keyword (object documents) and the candidate classification codes. The first degree of relatedness computationally determining process will be described below.

Firstly, the control section 1 computationally determines the frequency of appearance of the input keyword in the object documents and the frequency of appearance of the input keyword in all the documents and then determines the degree of significance of the input keyword on the basis of the two frequencies of appearance. The degree of significance of the input keyword is higher when the frequency of appearance of the input keyword is higher in a document. The degree of significance of the input keyword is higher when the frequency of appearance of the input keyword is lower in all the documents. If the frequency of appearance of an input keyword is 0 in a document, the degree of significance of the input keyword is equal to 0. Then, the control section 1 computationally determines the degree of significance of each of the candidate classification codes in each of the documents by means of the above-described technique. Additionally, the control section 1 computes the degree of relatedness between the input keyword and each of the candidate classification codes, using the degree of significance of the input keyword and that of the candidate classification code. The degree of relatedness is determined by computing the total sum of the products, each being the product of the degree of significance of the input keyword and that of the candidate classification code in each of the documents. With this degree of relatedness computationally determining process, the degree of relatedness is higher when the number of times of co-occurrences of the input keyword and the candidate classification code is large and when the degree of significance of the candidate classification code is high. Alternatively, the number of times of co-occurrences (the number of documents that contains both the input keyword and the candidate classification code) may be used as the degree of relatedness instead of using the degree of significance.

Then, the control section 1 prepares a list of candidate classification codes, ranking the candidate classification codes in the descending order of the degree of relatedness.

Figure 4:
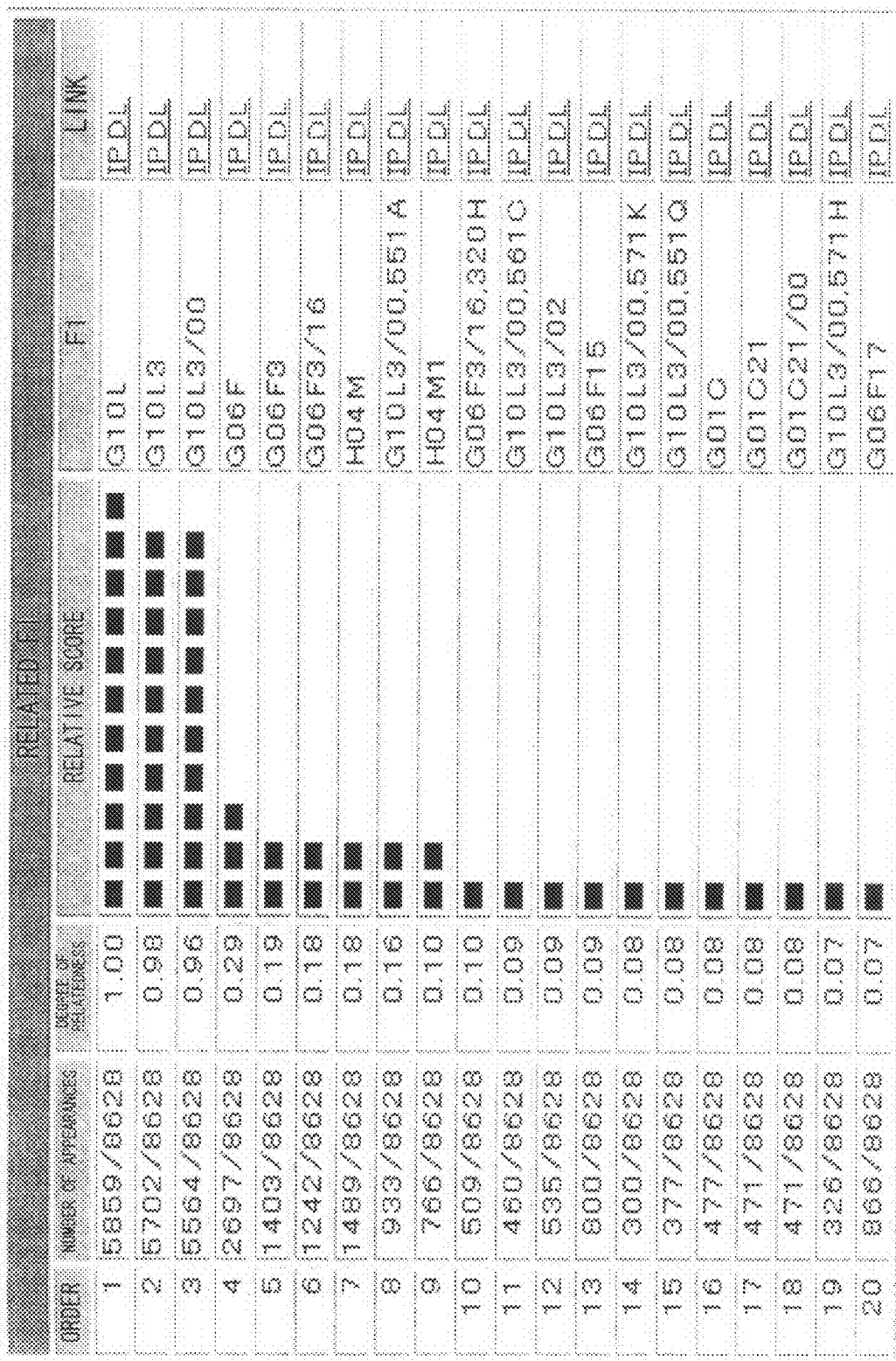
FIG. 4 is a schematic illustration of a list of candidate classification codes that can be used for the first embodiment.

FIG. 4 is a schematic illustration of a list of candidate classification codes that can be used for the first embodiment. In the illustrated list of candidate classification codes, each row shows a candidate classification code and the columns show the rank, the number of appearances, the degree of relatedness, the relative score, the candidate classification code (FI in this instance) and the link. Candidate classification codes are listed in the descending order of the degrees of relatedness by a predetermined number of candidate classification codes (twenty in this instance). The rank is in the descending order of the degree of relatedness. The number of appearances is displayed in the form of (the number of appearances of the candidate classification code)/(the number of documents that the input key information hits). The relative score is expressed by bar graphs of the relative value of the degree of relatedness relative to the largest value. The link is the link to the definition of the candidate classification code and displays the definition of the candidate classification code when clicked by the user. With this list of candidate classification codes, it is possible to reduce the number of candidate classification codes to the number of the displayed candidate classification codes by using the rank of the degrees of relatedness between the input keyword and the candidate classification codes (the first requirement of degree of relatedness).

In the illustrated instance, the total number of documents in the document DB 6 is 6,167,405 and the number of the documents hit by the input keyword is 8,628.

For the purpose of improving the efficiency and the processing speed of the processing steps S2 and S3, it may be so arranged that the control section 1 prepares a co-occurrence relations DB that shows the co-occurrence relations of keywords and classification codes in advance. Additionally, in step S2 the control section 1 may sum up the related classifications (add the totalized outcome of a lower hierarchy to that of a higher hierarchy), utilizing the hierarchical relations among the candidate classification codes (the hierarchy of the dot inscriptions for the IPC, the FI and the F term) and updating information.

As a result of the processing step S3, it is possible to extract the classification codes that frequently appear in the documents containing the input keyword as candidate classification codes.

Now, the operation of Step S4 will be described in detail.

While Step S4 is similar to Step S1, a candidate classification code is used as the retrieval key and all the documents are selected as objects of the retrieval operation (without being limited to the outcome of the retrieval in Step S1). Then, the retrieval section 2 retrieves the documents that contain the candidate classification code from all the documents in the document DB 6. The control section 1 repeats the directive for retrieval for all the candidate classification codes and the retrieval section 2 stores information on the group of the documents retrieved as a result of the operation in the memory section 5.

Now, the operation of Step S5 will be described in detail.

The control section 1 extracts related keywords that are related key information from the object documents retrieved in Step S4. A related keyword is a word contained in the object documents. If the word is a compound word, the control section 1 divides the compound word into a plurality of words in a multiple of steps, utilizing the word extraction technique described in the Non-Patent Document 1. A compound word is a word formed by combining a plurality of words such as "speech-recognition-apparatus". Then, the "speech-recognition-apparatus" is divided into "speech-recognition" and "apparatus" and "speech-recognition" is divided further into "speech" and "recognition". All the words that are obtained before, after and between the divisions ("speech-recognition-apparatus", "speech-recognition", "speech", and "recognition", "apparatus") are extracted as so many different words.

Now, the operation of Step S6 will be described in detail.

The control section 1 computationally determines the degree of relatedness between the candidate classification codes and the related keywords. More specifically, the control section 1 executes the second degree of relatedness computationally determining process that is devised by applying the process of computationally determining the degree of relatedness among words as described in the Non-Patent Document 1 to a process of computationally determining the degree of relatedness (the second degree of relatedness) between candidate classification codes (object documents) and related keywords. The second degree of relatedness computationally determining process will be described below.

Firstly, the control section 1 computationally determines the frequency of appearance of each related keyword in the object documents and the frequency of appearance of the related keyword in all the documents and then determines the degree of significance of the related keyword on the basis of the two frequencies of appearance. The degree of significance of the related keyword is higher when the frequency of appearance of the related keyword is higher in a document. The degree of significance of the related keyword is higher when the frequency of appearance of the related keyword is lower in all the documents. If the frequency of appearance of a related keyword is 0 in a document, the degree of significance of the related keyword is equal to 0. Then, the control section 1 computationally determines the degree of significance of each of the candidate classification codes in each of the documents by means of the above-described technique. Additionally, the control section 1 computes the degree of relatedness between each of the candidate classification codes and the related keyword, using the degree of significance of the candidate classification code and that of the related keyword. The degree of relatedness is determined by computing the total sum of the products, each being the product of the degree of significance of the candidate classification code and that of the related keyword in each of the documents. With this degree of relatedness computationally determining process, the degree of relatedness is higher when the number of times of co-occurrences of the candidate classification code and the related keyword is large and when the degree of significance of the related keyword is high. Alternatively, the number of times of co-occurrences (the number of documents that contain both the candidate classification code and the related keyword) may be used as the degree of relatedness instead of using the degree of significance.

Then, the control section 1 prepares a list of related keywords for each of the candidate classification codes, ranking the related keywords in the descending order of the degree of relatedness. Thus, the list of related keywords is a related key information list prepared from the list of the candidate classification codes and the related keywords obtained for each of the candidate classification codes.

FIG. 5 is a schematic illustration of a list of related keywords that can be used for the first embodiment, shown as the first example. It will be appreciated that the list of related keywords is formed by adding an item of related keywords (related words) in addition to the items of the list of candidate classification codes. Under the heading of related keyword, a predetermined number of related keywords (eleven in this instance) are displayed in the descending order of the degrees of relatedness. With this list of related keywords, it is possible to reduce the number of related keywords to the number of the displayed related keywords by using the rank of the degrees of relatedness between the candidate classification codes and the related keywords (the second requirement of degree of relatedness).

As a result of the processing step S6, it is possible to extract, as related keywords, words that appear frequently in documents including each of the candidate classification codes.

Now, the operation of Step S7 will be described in detail.

The control section 1 computationally determines the relatedness/conformity score (the second key information score) of each of the related keywords of each candidate classification code by evaluating the related keyword, comparing the related keyword and the input keyword. For example, the control section 1 gives 2 points as relatedness/conformity score to each of the higher order related keywords (in terms of the number of related keywords) that completely agrees with the input keyword (includes all the input keyword) and gives 1 point as relatedness/conformity score to each of the related keywords that partly agrees with the input keyword (includes all the input keyword) but gives 0 points as relatedness/conformity score to all the remaining related keywords.

Then, the control section 1 computationally determines the conformity score of each candidate classification code (candidate classification code score) by evaluating the candidate classification code on the basis of the relatedness/conformity scores of the related keywords belonging to the candidate classification code. More specifically, the control section 1 determines the largest value of the relatedness/conformity scores of the related keywords belonging to each candidate classification code as the conformity score of the candidate classification code. For example, the control section 1 gives 2 points to each of the candidate classification codes having the largest value of 2 as relatedness/conformity score and gives 1 points to each of the candidate classification codes having the largest value of 1 as relatedness/conformity score but gives 0 points to all the remaining candidate classification codes.

Alternatively, the control section 1 may determine the conformity scores of the candidate classification codes on the basis of the order of the related keywords that completely agree with the input keyword. Still alternatively, the control section 1 may sum up the relatedness/conformity scores of the related keywords belonging to each candidate classification code and uses the total as the conformity score of the candidate classification code. Still alternatively, the control section 1 may combine these computation techniques for determining the conformity scores of the candidate classification codes.

Subsequently, the control section 1 updates the list of related keywords according to the outcome of evaluation of the related keywords and the candidate classification codes. FIG. 6 is a schematic illustration of a list of related keywords that can be used for the first embodiment, shown as the second example. The values in the list of related keywords are same and identical with those displayed as a result of the processing step S6 and in fact FIG. 6 shows part of the candidate classification codes and the related keywords, enlarging them. It will be appreciated that some of the related keywords and some of the candidate classification codes are emphatically displayed according to the outcome of evaluation of the related keywords and the candidate classification codes. For example, the related keywords having 2 points as relatedness/conformity score are emphasized in red (with ⊚ affixed to the right shoulder thereof and the related keywords having 1 point as relatedness/conformity score are emphasized in yellow (with ○ affixed to the right shoulder thereof, while the classification codes having 2 points as conformity score are emphasized in red (with ⊚ affixed to the left shoulder thereof and the classification codes having 1 point as conformity score are emphasized in yellow (with ○ affixed to the left shoulder thereof.

In the list of related keywords, the related keyword "speech recognition" having 2 points as relatedness/conformity score is emphasized in red (with ⊚) and the related keywords "speech" and "recognition" having 1 point as relatedness/conformity score is emphasized in yellow (with ○).

In the list of related keywords, the candidate classification codes G10L, G10L3, G10L3/00 that are emphasized in red (with ⊚) are judged to be candidate classification codes that conform to the input keyword. The candidate classification codes H04M, H04M1 that are emphasized in yellow (with ○) are judged to be candidate classification codes that conform to the next lower degree. Of the candidate classification codes that are not emphasized, G06F, G06F3 are superordinate concepts and G01C, G01C21, G01C21/00 are related technological fields that are applicable fields of speech recognition.

The control section 1 may rearrange the candidate classification codes in the descending order of the conformity scores in the list of related keywords or display only the candidate classification codes having conformity scores that are higher than a predetermined threshold value.

Now, the operation of Step S8 will be described in detail.

The control section 1 determines the candidate classification codes having respective conformity scores that are higher than a predetermined threshold value as output classification codes. For example, the control section 1 determines the candidate classification codes having 2 points as conformity score as output classification codes. Alternatively, the ser may determine the output classification codes from the candidate classification codes, referring to the displayed information.

Now, the operation of Step S9 will be described in detail.

The operation of Step S9 is same as that of Step S1 except that the retrieval key is determined to be the output classification code and all the documents are selected as object of retrieval (the outcome of retrieval of Step S1 is not used as limitation). Then, the retrieval section 2 retrieves the documents that contain the candidate classification code from all the documents in the document DB 6.

The Steps S8 and S9 may be omitted.

Thus, with the above-described embodiment, it is possible to separate the main classifications and the related classifications. If the input keyword is "speech recognition" and the classification code A of "speech recognition" and the classification code B of "car navigator" are obtained as candidate classification codes, it is possible to judge that the classification code A where "speech recognition" that is same as the input keyword appears as higher order related keyword is main classification.

With this embodiment, it is possible to determine the appropriate hierarchy of a classification code. For example, if the input keyword is "battery", "H01M" (subclass) is obtained as output classification code while "H01M 8" (main group) and "H01M 8/14" (subgroup) are obtained respectively as output classification code for input keyword "fuel battery" and as output classification code for input keyword "molten carbonate fuel battery".

Additionally, with this embodiment, it is possible to determine that there is not any appropriate classification code. More specifically, it is possible to determine that there is not any appropriate classification code that matches the input key information (and that even the most related classification code is not appropriate) by carrying out the processing operations of Steps S4 through S8.

Still additionally, with this embodiment, it is possible to acquire one or more than one output classification codes of an appropriate hierarchy level that are strongly related to the input keyword. It is also possible to reduce retrieval noises and missing documents, improve the accuracy level of document retrieval and, at the same time, reduce the efforts on the part of the user by retrieving documents using the output classification code.

Second Embodiment

Now, the second embodiment of the invention will be described below by assuming that the input key information is a classification code.

The document retrieval apparatus of this embodiment has a configuration same as the document retrieval apparatus of FIG. 1. The summarized operation of the document retrieval apparatus of this embodiment is same as the one illustrated in FIG. 2.

Now, the operation of the document retrieval apparatus of this embodiment will be described in detail below.

Firstly, the operation of Step S1 will be described in detail.

FIG. 7 is a schematic illustration of an image of retrieval input unit that can be used for the second embodiment. In the image of retrieval input unit, the user can input a classification code as input key information (retrieval formula). The input classification code is referred to as input classification code (the first classification code). In the illustrated instance, the type of input classification code is FI and the value of the input classification code is "G10L 3/00". In the image of retrieval input unit, the user can specify the type of output classification code (the second classification code). In the illustrated instance, the type of output classification code is F term (theme code). Alternatively, it may be so arranged that the control section 1 has the user specify a patent document, extract a predetermined type of classification code from the document and input the extracted classification code as input classification code.

The control section 1 directs the retrieval section 2 to operate for retrieval, specifying all the documents as object of retrieval and using the input classification code as retrieval key. The retrieval section 2 retrieves the documents that contain the input classification code from all the documents in the document DB 6 and stores information on the group of documents relative to the input keyword in the memory section 5.

While the operation of Step S2 is same as that of the first embodiment, the type of candidate classification code is same as the type of output classification code, which is F term in the illustrated example.

Now, the operation of Step S3 will be described in detail.

The control section 1 computationally determines the degree of relatedness between the input classification code and the candidate classification codes from the documents obtained in Step S1 as object documents. More specifically, the control section 1 executes the first degree of relatedness computationally determining process that is devised by applying the process of computationally determining the degree of relatedness among words as described in the Non-Patent Document 1 to a process of computationally determining the degree of relatedness (the first degree of relatedness) between the input classification code (object documents) and the candidate classification codes. The first degree of relatedness computationally determining process will be described below.

Firstly, the control section 1 computationally determines the frequency of appearance of the input classification code in the object documents and the frequency of appearance of the input classification code in all the documents and then determines the degree of significance of the candidate classification code on the basis of the two frequencies of appearance. Then, the control section 1 computationally determines the degree of significance of each of the candidate classification codes in each of the documents by means of the above-described technique. Additionally, the control section 1 computes the degree of relatedness between the input classification code and each of the candidate classification codes, using the degree of significance of the input classification code and that of the candidate classification code. With this degree of relatedness computationally determining process, the degree of relatedness is higher when the number of times of co-occurrences of the input classification code and the candidate classification code is large and when the degree of significance of the candidate classification code is high. Alternatively, the number of times of co-occurrences (the number of documents that contains both the input classification code and the candidate classification code) may be used as the degree of relatedness instead of using the degree of significance.

Then, the control section 1 prepares a list of candidate classification codes, ranking the candidate classification codes in the descending order of the degree of relatedness.

Figure 8:
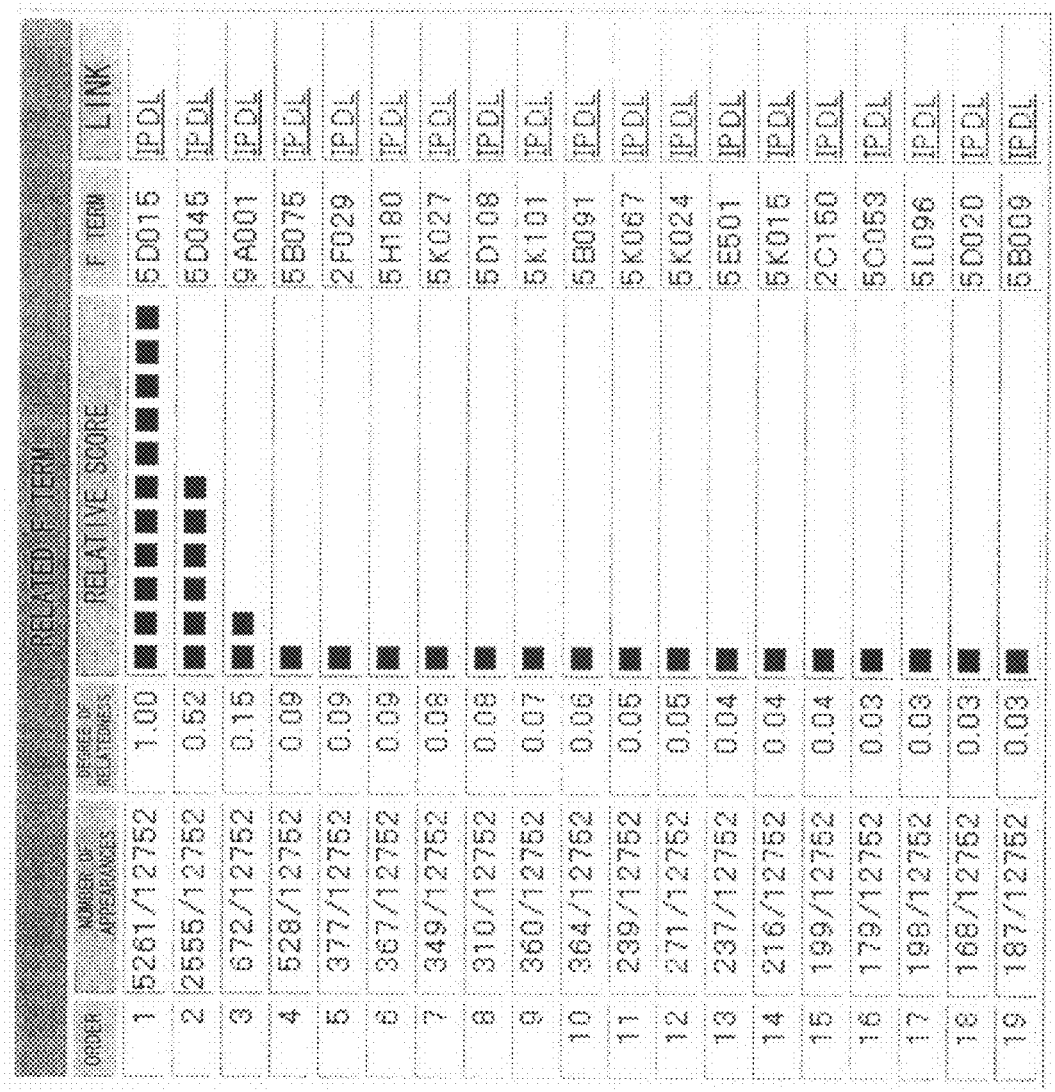
FIG. 8 is a schematic illustration of a list of candidate classification codes that can be used for the second embodiment.

FIG. 8 is a schematic illustration of a list of candidate classification codes that can be used for the second embodiment. In the illustrated instance, the candidate classification code is F term. In the illustrated instance, the total number of documents in the document DB 6 is 6,167,405 and the number of the documents hit by the input classification code is 12,752. With this list of candidate classification codes, it is possible to reduce the number of candidate classification codes to the number of the displayed candidate classification codes by using the rank of the degrees of relatedness between the input keyword and the candidate classification codes (the first requirement of degree of relatedness).

As a result of the processing step S3, it is possible to extract the classification codes that frequently appear in the documents containing the input classification code (of the type same as the output classification code) as candidate classification codes.

The operation of Step S4 is same as that of Step S4 of the first embodiment.

Now, the operation of Step S5 will be described in detail.

The control section 1 extracts related classification codes that are related key information from the object documents retrieved in Step S4. A related classification code is a classification code of the type same as the input classification code and a classification code contained in the object documents.

Now, the operation of Step S6 will be described in detail.

The control section 1 computationally determines the degree of relatedness between the candidate classification codes and the related classification codes. More specifically, the control section 1 executes the second degree of relatedness computationally determining process that is devised by applying the process of computationally determining the degree of relatedness among words as described in the Non-Patent Document 1 to a process of computationally determining the degree of relatedness (the second degree of relatedness) between candidate classification codes (object documents) and related classification codes. The second degree of relatedness computationally determining process will be described below.

Firstly, the control section 1 computationally determines the frequency of appearance of each related classification code in the object documents and the frequency of appearance of the related classification code in all the documents and then determines the degree of significance of the related classification code on the basis of the two frequencies of appearance. Then, the control section 1 computationally determines the degree of significance of each of the candidate classification codes in each of the documents by means of the above-described technique. Additionally, the control section 1 computes the degree of relatedness between each of the candidate classification codes and the related classification code, using the degree of significance of each of the classification codes and that of the related classification code. The degree of relatedness is determined by computing the total sum of the products, each being the product of the degree of significance of the candidate classification code and that of the related classification code in each of the documents. With this degree of relatedness computationally determining process, the degree of relatedness is higher when the number of times of co-occurrences of the candidate classification code and the related classification code is large and when the degree of significance of the related classification code is high. Alternatively, the number of times of co-occurrences (the number of documents that contains both the candidate classification code and the related classification code) may be used as the degree of relatedness instead of using the degree of significance.

Then, the control section 1 prepares a list of related classification codes for each of the candidate classification codes, ranking the related classification codes in the descending order of the degree of relatedness. Thus, the list of related classification codes is a related key information list prepared from the list of the candidate classification codes and the related classification codes obtained for each of the candidate classification codes.

FIG. 9 is a schematic illustration of a list of related classification codes that can be used for the second embodiment, shown as the first example. It will be appreciated that the list of related classification codes is formed by adding an item of related classification codes (related words) in addition to the items of the list of candidate classification codes. Under the heading of related classification code, a predetermined number of related classification codes (eleven in this instance) are displayed in the descending order of the degrees of relatedness. With this list of related classification codes, it is possible to reduce the number of related classification codes to the number of the displayed related classification codes by using the rank of the degrees of relatedness between the candidate classification codes and the related classification codes (the second requirement of degree of relatedness).

As a result of the processing step S6, it is possible to extract, as related classification codes, classification codes (of the type same as the input classification code) that frequently appears in the documents containing each candidate classification code. Additionally, it is possible to reduce the number of related classification codes to that of related classification codes showing a high degree of relatedness by computationally determining the degree of relatedness between each candidate classification code and each related classification code.

Now, the operation of Step S7 will be described in detail.

The control section 1 evaluates each related classification code, comparing the input classification code and the related classification code for each candidate classification code. For example, the control section 1 gives 2 points as relatedness/conformity score to each of the higher order related classification codes (in terms of the number of related classification codes) that completely agrees with the input classification code (includes all the input classification code) and gives 1 point as relatedness/conformity score to each of the related classification codes that partly agrees with the input classification code but gives 0 points as relatedness/conformity score to all the remaining related classification codes.

Then, the control section 1 evaluates the candidate classification code on the basis of the relatedness/conformity scores of the related classification codes belonging to the candidate classification code. More specifically, the control section 1 determines the largest value of the relatedness/conformity scores of the related classification codes belonging to each candidate classification code as the conformity score of the candidate classification code. For example, the control section 1 gives 2 points to each of the candidate classification codes having the largest value of 2 as relatedness/conformity score and gives 1 points to each of the candidate classification codes having the largest value of 1 as relatedness/conformity score but gives 0 points to all the remaining candidate classification codes.

Alternatively, the control section 1 may determine the conformity scores of the candidate classification codes on the basis of the order of the related classification codes that completely agree with the input classification code. Still alternatively, the control section 1 may sum up the relatedness/conformity scores of the related classification codes belonging to each candidate classification code and uses the total as the conformity score of the candidate classification code. Still alternatively, the control section 1 may combine these computation techniques for determining the conformity scores of the candidate classification codes.

Subsequently, the control section 1 updates the list of related classification codes according to the outcome of evaluation of the related classification codes and the candidate classification codes. FIG. 10 is a schematic illustration of a list of related classification codes that can be used for the second embodiment, shown as the second example. The values in the list of related classification codes are same and identical with those displayed as a result of the processing step S6 and in fact FIG. 10 shows part of the candidate classification codes and the related classification codes, enlarging them. It will be appreciated that some of the related classification codes and some of the candidate classification codes are emphatically displayed according to the outcome of evaluation of the related classification codes and the candidate classification codes. For example, the related classification codes having 2 points as relatedness/conformity score are emphasized in red (with ◉ affixed to the right shoulder thereof) and the related classification codes having 1 point as relatedness/conformity score are emphasized in yellow (with ○ affixed to the right shoulder thereof, while the classification codes having 2 points as conformity score are emphasized in red (with ◉ affixed to the left shoulder thereof) and the classification codes having 1 point as conformity score are emphasized in yellow (with ○ affixed to the left shoulder thereof).

In the list of related classification codes, the candidate classification codes 5D015, 5D045, 5D091 that are emphasized in red (with ◉) are judged to be candidate classification codes that conform to the input classification code. The candidate classification codes that are not emphasized, or 5B075, 2F029, 5H180, 5K027, 5K024, 5E501, 5K015, 2C150, 5C053, 5L096, 5D020, 5B009 are related technological fields that are applicable fields of speech recognition.

The control section 1 may rearrange the candidate classification codes in the descending order of the conformity scores in the list of related classification codes or display only the candidate classification codes having conformity scores that are higher than a predetermined threshold value.

The operations of Steps S8 and S9 are same as those of the first embodiment.

Thus, with this embodiment, it is possible to acquire one or more than one output classification codes of an appropriate hierarchy level that are strongly related to the input classification code. It is also possible to reduce retrieval noises and missing documents, improve the accuracy level of document retrieval and, at the same time, reduce the efforts on the part of the user by retrieving documents using the output classification code.

The acquisition section in the appended claims corresponds to the input section of the embodiments. The first retrieval section, the first extraction section, the second retrieval section, the second extraction section and the evaluation section correspond to the control section of the embodiments.

The acquisition step and the first retrieval step in the appended claims correspond to Step S1 in the above description of the embodiments. The first extraction step corresponds to Steps S2, S3 in the above description of the embodiments. The second retrieval step corresponds to Step S4 in the above description of the embodiments. The second extraction step corresponds to Steps S5, S6 in the above description of the embodiments. The evaluation step corresponds to Steps S7, S8 in the above description of the embodiments. The third retrieval step corresponds to Step S9 in the above description of the embodiments.

The above-described embodiments of document retrieval apparatus can be applied to information processing apparatus with ease to enhance the performance of the information processing apparatus. For the purpose of the present invention, such information processing apparatus include servers and PCs (personal computers).

It is possible to provide a program that causes the computer of a document retrieval apparatus to execute the above-described steps as document retrieval program. The program can cause the computer of a document retrieval apparatus to execute the above-described steps when it is stored in a computer readable recording medium. Computer readable recording mediums that can be used for the purpose of the present invention include internal storage apparatus such as ROMs and RAMs mounted in computers, portable type storage mediums such as CD-ROMs, flexible disks, DVD disks, magneto-optical disks and IC cards, databases holding computer programs, external computers, databases of such computers and transmission mediums on communication lines.

What is claimed is:

1. A medium computer-readably storing a document retrieval program for causing a computer to execute a process, the process comprising:
   acquiring first key information which is a specific type of information;
   retrieving first documents including the first key information from a plurality of documents in a database, each of the plurality of documents including at least one of output classification codes, the output classification codes classifying the plurality of documents;
   extracting codes of the output classification codes from the first documents as candidate classification codes;
   retrieving second documents including the candidate classification codes from the plurality of documents;
   extracting second key information which is the specific type of information, from the second documents; and
   evaluating the candidate classification codes on a basis of comparison of the first key information and the second key information; wherein
   the extracting of the second key information associates a first candidate classification code of the candidate classification codes with a first piece of the second key information extracted from one of the second documents including the first candidate classification code, and repeats the associating for all of the candidate classification codes, and
   the evaluating determines a second key information score of a second piece of the second key information on a basis of a degree of agreement of the second piece of the second key information relative to the first key information, repeats the determining of the second key information score for all pieces of the second key information so as to determine second key information scores of all pieces of the second key information, determines a candidate classification code score of a second candidate classification code of the candidate classification codes on the basis of a second key information score of a piece of the second key information corresponding to the second candidate classification code, repeats the determining of the candidate classification code score for all of the candidate classification codes so as to determine candidate classification code scores of the candidate classification codes, and uses the candidate classification code scores as an outcome of the evaluating.

2. The medium storing a document retrieval program according to claim 1, wherein
   the extracting of the candidate classification codes extracts, from a hierarchical structure of the output classification codes, an additional candidate classification code of a higher hierarchy to which one of the candidate classification codes belongs, and adds the additional candidate classification code to the candidate classification codes.

3. The medium storing a document retrieval program according to claim 1, wherein
   the specific type of information is at least one keyword.

4. The medium storing a document retrieval program according to claim 3, wherein
   when the extracting of the second key information extracts the compound word from the second documents, the extracting of the second key information divides the compound word into a plurality of words and adds the plurality of words to the second key information.

5. The medium storing a document retrieval program according to claim 1, wherein
   the specific type of information is at least one of input classification codes different from the output classification codes.

6. The medium storing a document retrieval program according to claim 5, wherein
   the extracting of the second key information extracts a code of the input classification codes from the second documents as first input classification codes, extracts, from a hierarchical structure of the input classification codes, a second input classification code of a higher hierarchy to which one of the first input classification codes belongs, and uses the first input classification codes and the second input classification code as the second key information.

7. The medium storing a document retrieval program according to claim 1, wherein
   the extracting of the candidate classification codes determines first degrees of relatedness for the candidate classification codes respectively, and each of the first degrees of relatedness indicates extent of relatedness between the first key information and the corresponding code of the candidate classification codes.

8. The medium storing a document retrieval program according to claim 7, wherein
   the extracting of the candidate classification codes extracts codes of the output classification codes from the first documents as auxiliary candidate classification codes, and selects, from the auxiliary candidate classification codes, codes of the output classification codes that satisfy a predetermined requirement of the first degrees of relatedness as the candidate classification codes.

9. The medium storing a document retrieval program according to claim 1, wherein
   the evaluating selects, from the candidate classification codes, a code satisfying a predetermined requirement of an outcome of the evaluating.

10. The medium storing a document retrieval program according to claim 9, wherein
    the process further comprises retrieving third documents including the selected code from the plurality of documents.

11. The medium storing a document retrieval program according to claim 1, wherein
    the evaluating displays a list of the candidate classification codes, selects a code of the output classification code from the candidate classification codes according to an outcome of the evaluating, and emphasizes the selected code.

12. The medium storing a document retrieval program according to claim 1, wherein the evaluating sorts a list of the candidate classification codes according to the candidate classification code scores and displays the sorted list.

13. A medium computer-readably storing a document retrieval program for causing a computer to execute a process, the process comprising:

acquiring first key information which is a specific type of information;

retrieving first documents including the first key information from a plurality of documents in a database, each of the plurality of documents including at least one of output classification codes, the output classification codes classifying the plurality of documents;

extracting codes of the output classification codes from the first documents as candidate classification codes;

retrieving second documents including the candidate classification codes from the plurality of documents;

extracting second key information which is the specific type of information, from the second documents; and evaluating the candidate classification codes on a basis of comparison of the first key information and the second key information; wherein the extracting of the second key information associates a first candidate classification code of the candidate classification codes with a first piece of the second key information extracted from one of the second documents including the first candidate classification code, and repeats the associating for all of the candidate classification codes, the extracting of the second key information determines second degrees of relatedness for the candidate classification codes respectively, each of the second degrees of relatedness indicates extent of relatedness between the corresponding code of the candidate classification codes and a piece of the second key information associated with the corresponding code, and the evaluating determines a second key information score of a second piece of the second key information on a basis of a degree of agreement of the second piece of the second key information relative to the first key information and the second degrees of relatedness, repeats the determining of the second key information score for all pieces of the second key information so as to determine second key information scores of all pieces of the second key information, determines a candidate classification code score of a second candidate classification code of the candidate classification codes on a basis of a second key information score of a piece of the second key information corresponding to the second candidate classification code, repeats the determining of the candidate classification code score for all of the candidate classification codes so as to determine candidate classification code scores of candidate classification codes, and uses the candidate classification code scores as an outcome of the evaluating.

14. The medium storing a document retrieval program according to claim 13, wherein the extracting of the second key information extracts, from the second documents, auxiliary information which is the specific type of information, and selects, from the auxiliary information, pieces of the auxiliary information that satisfy a predetermined requirement of the second degrees of relatedness as the second key information.

15. A document retrieval apparatus comprising:

an acquisition section that acquires first key information which is a specific type of information;

a first retrieval section that retrieves first documents including the first key information from a plurality of documents in a database, each of the plurality of documents including at least one of output classification codes, the output classification codes classifying the plurality of documents;

a first extraction section that extracts codes of the output classification codes from the first documents as candidate classification codes;

a second retrieval section that retrieves second documents including the candidate classification codes from the plurality of documents;

a second extraction section that extracts second key information which is the specific type of information, from the second documents; and an evaluation section that evaluates the candidate classification codes on a basis of comparison of the first key information and the second key information; wherein the second extraction section associates a first candidate classification code of the candidate classification codes with a first piece of the second key information extracted from one of the second documents including the first candidate classification code, and repeats the associating for all of the candidate classification codes, and the evaluation section determines a second key information score of a second piece of the second key information on a basis of a degree of agreement of the second piece of the second key information relative to the first key information, repeats the determining of the second key information score for all pieces of the second key information so as to determine second key information scores of all pieces of the second key information, determines a candidate classification code score of a second candidate classification code of the candidate classification codes on the basis of a second key information score of a piece of the second key information corresponding to the second candidate classification code, repeats the determining of the candidate classification code score for all of the candidate classification codes so as to determine candidate classification code scores of the candidate classification codes, and uses the candidate classification code scores as an outcome of the evaluating.

16. The apparatus according to claim 15, wherein the first extraction section also extracts, from a hierarchical structure of the output classification codes, an additional candidate classification code of a higher hierarchy to which one of the candidate classification codes belongs, and adds the additional candidate classification code to the candidate classification codes.

17. A document retrieval method comprising:

acquiring first key information which is a specific type of information;

retrieving first documents including the first key information from a plurality of documents in a database, each of the plurality of documents including at least one of output classification codes, the output classification codes classifying the plurality of documents;

extracting codes of the output classification codes from the first documents as candidate classification codes;

retrieving second documents including the candidate classification codes from the plurality of documents;

extracting second key information which is the specific type of information, from the second documents; and evaluating the candidate classification codes on a basis of comparison of the first key information and the second key information; wherein the extracting of the second key information associates a first candidate classification code of the candidate classification codes with a first piece of the second key information extracted from one of the second documents including the first candidate classification code, and repeats the associating for all of the candidate classification codes, and the evaluating determines a second key information score of a second piece of the second key information on a basis of a degree of agreement of the second piece of the second key information relative to the first key information, repeats the determining of the second key information score for all pieces of the second key information so as to determine second key information scores of all pieces of the second key information, determines a candidate classification code score of a second candidate classification code of the candidate classification codes on the basis of a second key information score of a piece of the second key information corresponding to the second candidate classification code, repeats the determining of the candidate classification code score for all of the candidate classification codes so as to determine candidate classification code scores of the candidate classification codes, and uses the candidate classification code scores as an outcome of the evaluating.

18. A document retrieval apparatus comprising:

an acquisition section that acquires first key information which is a specific type of information;

a first retrieval section that retrieves first documents including the first key information from a plurality of documents in a database, each of the plurality of documents including at least one of output classification codes, the output classification codes classifying the plurality of documents;

a first extraction section that extracts codes of the output classification codes from the first documents as candidate classification codes;

a second retrieval section that retrieves second documents including the candidate classification codes from the plurality of documents;

a second extraction section that extracts second key information which is the specific type of information, from the second documents; and an evaluation section that evaluates the candidate classification codes on the a basis of comparison of the first key information and the second key information; wherein the second extraction section associates a first candidate classification code of the candidate classification codes with a first piece of the second key information extracted from one of the second documents including the first candidate classification code, and repeats the associating for all of the candidate classification codes, the second extraction section determines second degrees of relatedness for the candidate classification codes respectively, each of the second degrees of relatedness indicates extent of relatedness between the corresponding code of the candidate classification codes and a piece of the second key information associated with the corresponding code, and the evaluation section determines a second key information score of a second piece of the second key information on a basis of a degree of agreement of the second piece of the second key information relative to the first key information and the second degrees of relatedness, repeats the determining of the second key information score for all pieces of the second key information so as to determine second key information scores of all pieces of the second key information, determines a candidate classification code score of a second candidate classification code of the candidate classification codes on a basis of a second key information score of a piece of the second key information corresponding to the second candidate classification code, repeats the determining of the candidate classification code score for all of the candidate classification codes so as to determine candidate classification code scores of candidate classification codes, and uses the candidate classification code scores as an outcome of the evaluating.

19. A document retrieval method comprising:

acquiring first key information which is a specific type of information;

retrieving first documents including the first key information from a plurality of documents in a database, each of the plurality of documents including at least one of output classification codes, the output classification codes classifying the plurality of documents;

extracting codes of the output classification codes from the first documents as candidate classification codes;

retrieving second documents including the candidate classification codes from the plurality of documents;

extracting second key information which is the specific type of information, from the second documents; and evaluating the candidate classification codes on the a basis of comparison of the first key information and the second key information; wherein the extracting of the second key information associates a first candidate classification code of the candidate classification codes with a first piece of the second key information extracted from one of the second documents including the first candidate classification code, and repeats the associating for all of the candidate classification codes, the extracting of the second key information determines second degrees of relatedness for the candidate classification codes respectively, each of the second degrees of relatedness indicates extent of relatedness between the corresponding code of the candidate classification codes and a piece of the second key information associated with the corresponding code, and the evaluating determines a second key information score of a second piece of the second key information on a basis of a degree of agreement of the second piece of the second key information relative to the first key information and the second degrees of relatedness, repeats the determining of the second key information score for all pieces of the second key information so as to determine second key information scores of all pieces of the second key information, determines a candidate classification code score of a second candidate classification code of the candidate classification codes on a basis of a second key information score of a piece of the second key information corresponding to the second candidate classification code, repeats the determining of the candidate classification code score for all of the candidate classification codes so as to determine candidate classification code scores of candidate classification codes, and uses the candidate classification code scores as an outcome of the evaluating.

* * * * *